Dec. 8, 1964      F. L. CHAN      3,160,748
SPHERICAL GONIOMETER HEAD AND ADAPTER
Filed June 28, 1962      2 Sheets-Sheet 1

INVENTOR.
FRANK L. CHAN
BY
ATTORNEYS

Dec. 8, 1964   F. L. CHAN   3,160,748
SPHERICAL GONIOMETER HEAD AND ADAPTER
Filed June 28, 1962   2 Sheets-Sheet 2

INVENTOR.
FRANK L. CHAN
BY
ATTORNEYS

United States Patent Office 3,160,748
Patented Dec. 8, 1964

3,160,748
SPHERICAL GONIOMETER HEAD AND
ADAPTER
Frank L. Chan, 3228 Ravenwood Road, Fairborn, Ohio
Filed June 28, 1962, Ser. No. 206,103
3 Claims. (Cl. 250—51.5)
(Granted under Title 35, U.S. Code (1952), sec. 266)

The invention described herein may be manufactured and used by and for the United States Government for governmental purposes without the payment to me of any royalty thereon.

This invention relates to a new and improved X-ray camera goniometer head and adapter for use with cameras such as the General Electric Company XRD X-ray Precision Powder Camera and the like, for use in the taking of X-ray powder diffraction patterns and in the taking of oscillation, rotation, and translation photographs of single crystals.

Illustrative patents that describe the use of X-ray crystal camera equipment in the study of crystal structures are patents numbered 2,926,258; 2,847,579; 2,417,-657; 2,380,236; and 2,025,488.

The lightweight goniometer head that is contemplated hereby is of spherical shape and is mounted in an adapter that permits a sample presentation to an incident X-ray beam over a wide choice of angles. Equally spaced apertures in the goniometer head are preferred as sockets for a pin used to rotate the sphere is setting the crystal at perfect alignment on its axis or at a desired angle. The goniometer head is maintained steadily in its prescribed rotation by magnetic forces maintained by built-in permanent magnets. The goniometer head permits the advantageous use of a commercially available low power motor of 0.75 watt and 0.0286 ampere on a 125 volt power line. The goniometer head weighs from 7.5 to 16 grams, depending on the material of which it is made, as compared with the weight of 139.7 grams for the goniometer head that it replaces.

The improved goniometer head and adapter that are disclosed herein are designed as a miniaturized, lightweight device, as compared with previously commercially available equipment, and particularly in the Weissenberg or precession X-ray moving film cameras.

The present goniometer head and adapter are well designed for use with the Frank L. Chan apparatus disclosed in his patent application Serial No. 58,585 that was filed September 26, 1960, now Patent No. 3,079,500 issued February 26, 1963, for X-Ray Camera Attachment and with apparatus described in the literature cited in the Chan application.

Objects of the present invention are to provide an improved, small goniometer head and adapter. The goniometer head is within one and one-half inch overall lateral dimension. The proposed assembly contains magnets that hold the assembly fixedly in adjustment for overcoming mechanical tolerances, clearances and the like. The goniometer head has a small mass in the order of seven and one-half grams weight when made of an aluminum alloy. The goniometer head is of spherical shape and is removably positioned in a spring-pressed mount to be easily and rapidly adjusted at any desired angle with respect to an X-ray beam directed toward and above the sphere and to the surface of which sphere one crystal, or powdered crystals within a capillary tube, may be attached with a glue such as cellulose acetate, or the like, for adjusting a particular crystal axis in a preferred orientation with respect to an incident X-ray beam. The apparatus can be used to produce Debye-Sherrer X-ray powder patterns, single crystal rotation and oscillation X-ray photographs and the like after the apparatus is properly aligned.

The improved apparatus requires a minimum of alignment when used with moving film X-ray cameras such as the Weissenberg and similar makes of precision cameras. The apparatus permits the precise adjustment of the goniometer head, using a protractor in setting a crystal attached to the spherical goniometer head, for the taking of accurately adjusted position and oscillation photographs in determining precise lattice parameters using the single crystal oscillation method.

A physical embodiment of the present invention is illustrated in the accompanying drawings wherein.

Figure 1:
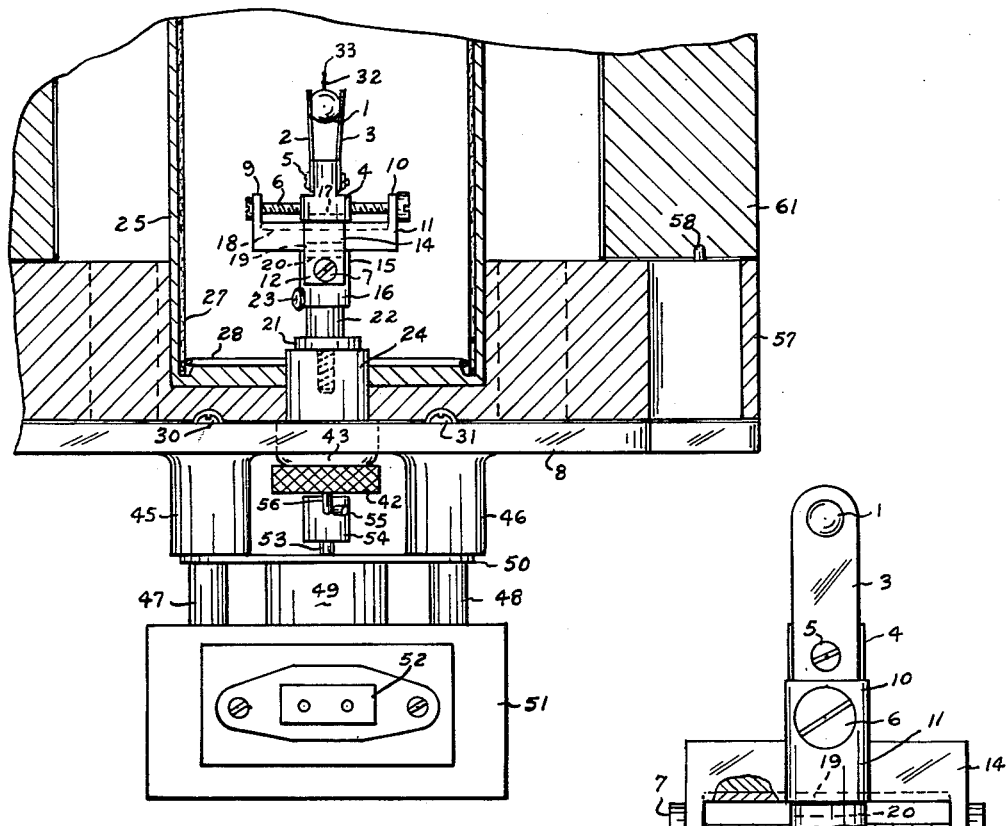
FIG. 1 is an elevational view that is partially broken away and in section of the goniometer head and adapter that embody the present invention, mounted for motor-driven operation.
Figure 2:
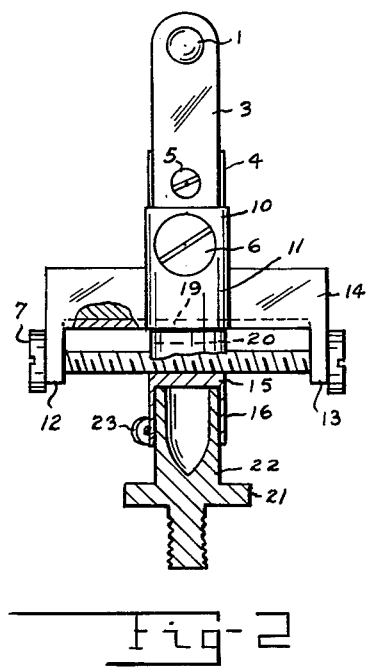
FIG. 2 is an enlarged view, with parts broken away and in section, of the goniometer head and the adapter that are shown in FIG. 1 rotated through an angle of 90°.

The goniometer head 1 in FIG. 1 of the accompanying drawings is of spherical shape and preferably is made of an aluminum alloy, beryllium, a plastic, or the like. The goniometer head 1 may be hollow or solid, and may be apertured or not, as preferred.

The spherical shape of the goniometer head 1 is adapted for having a sample crystal glued to its surface or, if preferred, the goniometer head may be apertured to receive the crystal or to receive a capillary tube 32 with one of its ends secured in an aperture in the head 1 and with a crystal 33 firmly cemented with cellulose acetate or the like to the distal end of the tube 32.

The goniometer head 1 is preferably mounted for its complete rotation through any desired angle, such as by being seated in opposed indentations or apertures in a pair of spring metal strips 2 and 3 of stainless steel or the like. The pair of spring metal strips 2 and 3 are spring-loaded toward each other with sufficient firmness to avoid any objectionable displacement of the goniometer head during its rotation. An angular scale applied to the goniometer head permits its adjustment at any desired angle.

The spring metal strips 2 and 3 have their ends remote from their engagement with the goniometer head 1 attached firmly to the upper end of a goniometer head supporting first block 4 by suitable means such as by the bolt 5 or the like.

Provision is made for the linear adjustment of the goniometer head 1 in two horizontal directions and also vertically in three planes that are all normal to each other.

A screw 6 threads through an internally threaded aperture in the lower end of the first block 4, such that on the turning of the screw 6, the first block 4 moves linearly along the screw 6. The screw 6 has its ends journalled in upstanding ears 9 and 10 at the opposite ends of one arm 11 of an X-shaped double yoke that supports the goniometer head.

A second screw 7 has its opposite ends journalled in downwardly extending ears 12 and 13 at the opposite ends of the other arm 14 of the goniometer head supporting X-shaped double yoke. The externally threaded shaft of the second screw 7 engages internal threads in an aperture in a second block 15 that supports the X-shaped double yoke at the central junction of its arms 11 and 14, such that on turning of the screw 7, the second block 15 moves linearly of the arm 14.

Machine clearances between mechanical parts of the assembly, such illustratively as between the internal threads in the first block 4 and the external threads on the first screw 6 and between the ends of the screw 6 journalled in the ears 9 and 10, are compensated for by maintaining magnetic bonds between adjacent metal surfaces.

A permanent ferro-magnet 17 illustratively of very light weight is countersunk in the lower surface of the block 4, where the double yoke arms 11 and 14 are made of a magnetically attracted metal such as iron or steel. Where preferred, another magnet 18, that is of opposite polarity to the polarity of the first magnet 17, is embedded in the upper surface for the length of the yoke arm 11. The pair of magnets increases the strength of the magnetic bond between the block 4 and the yoke arm 11.

Machine clearances between the internal threads of the second block 15 and the external threads on the shaft of the adjusting second screw 7 and its end mounts are compensated for in a corresponding way by one magnet or, if preferred, by the pair of magnets 19 and 20, that are embedded respectively in the abutting metal surfaces at the lower face of the X-shaped double yoke along the length of the yoke arm 14 and at the top of the second block 15.

The pairs of magnets at the surfaces of the blocks 4 and 15 and on the opposite sides of the double yoke arms 11 and 14, effectively minimize undesired displacements between the adjacent parts of the device during the mechanical displacement of one member of the assembly with respect to the other and particularly during the mechanically driven rotation of the goniometer head 1.

The vertical adjustment of the goniometer head 1 is accomplished by loosening the screw 23 and then raising or lowering the collar 16 and the superstructure that it supports with respect to the stub shaft 22 and then by tightening the screw 23 to secure the collar 16 at its desired elevation.

The lower part of the second block 15 is apertured axially to receive the upper end of the goniometer head driving stub shaft 22 to which the second block 15 is vertically adjustably secured by means of the set screw 23, as previously described.

The stub shaft 22 is provided with a collar 21 below which it threads downwardly into a vertically supported connecting second stub shaft (not shown). The connecting second stub shaft rotates within a journal supporting cylindrical housing 24. The vertically supported connecting second stub shaft terminates downwardly in a knurled knob 42 by the rotation of which the goniometer head 1 is rotated manually through most of a circle and is rotated continuously by a motor, not shown, within the motor housing 51. The lower end of the cylindrical second stub shaft housing 24 is welded at 43 to the bracket 8.

The bracket 8 is supported through a pair of bosses 45 and 46 by the pair of strut members 47 and 48, by the member 49 and by the plate 50 from the motor housing 51 to which the assembly is attached by the screws 30 and 31.

A motor within the motor housing 51 is energized from the electrical socket 52. The motor shaft 53 is journalled through the member 49 and terminates upwardly in the boss 54 that is spaced axially slightly below the knurled knob 42. The knob 42 is adapted to be driven in a suitable manner by the motor shaft 53, such as by the pin 55 that projects laterally from the shaft boss 54 to engage the pin 56 that projects downwardly from the lower face of the knob 42.

This arrangement provides for both the desired precise adjustment of the crystal 33 with respect to an X-ray beam incident thereto by the manual operation of the knurled knob 42, and also provides for the continuous rotation of the goniometer head 1 through the engagement of the two pins 55 and 56.

Accuracy and precision in the rotation of the goniometer head 1 as it is being rotated by the motor within the motor housing 51 and the intervening assembly is an object of this invention. The screws 6 and 7 permit adjustments in the horizontal plane to hold the sample crystal at precisely the center of rotation. The spherical structure of the goniometer head 1 and its retention between the spring metal strips 2 and 3 permits refinements of adjustment that were not previously available.

The sample bearing goniometer head 1 may be conveniently inserted between, adjusted between or removed from between the pair of stainless steel, spring metal clamping strips 2 and 3. The crystal sample may be adjusted with precise accuracy with respect to the direction of the X-ray beam that is to be incident to a particular axis of the crystal. The adjustment may be secured as the bolt 5 is tightened to its firmly mounting position.

Further adjustment is provided in the horizontal plane by the rotation of the adjusting screws 6 and 7 in directions that are normal with respect to each other. All of the adjustments between pairs of members of the device are independent of the influence of single magnets or pairs of magnets, such as the magnets 17 to 20, inclusive.

The magnets 17, 18, 19 and 20 are thin bars or discs of lightweight material and preferably are permanent magnets that are embedded in pairs with one above the other on the upper and lower contacting carriage tracks of the X-shaped double yoke arms 11 and 14 at their junction. The pairs of magnets serve to hold the carriage in place during its rotation.

Where preferred the magnets 17 to 20, inclusive, may be iron discs and that glued to, or that are embedded in, the facing surfaces of the yoke arms. By this magnet and carriage track or yoke arm arrangement, the assembly turns with precision on its axis and without warping, and without the crystal bearing goniometer head flipping back and forth as it is rotated.

In taking single crystal rotation photographs the camera is held in the vertical position and the magnet equipped apparatus assists in maintaining the desired rotation of the crystal around its axis.

The magnet compensation for mechanical looseness that may result from machining tolerances or other causes, holds the spherical goniometer head firmly rotating around its diameter that is coincident with the cylindrical axis of the assembly and so that no flopping action occurs away from the direction of the incident X-ray beam. The second bar magnet preferably should be perpendicular to the first bar magnet.

Figure 4:
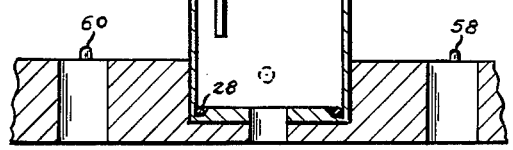
FIG. 4 is a reduced size sectional view of the hollow cylinder in FIG. 1 adapted for containing a desired atmosphere.
Figure 3:
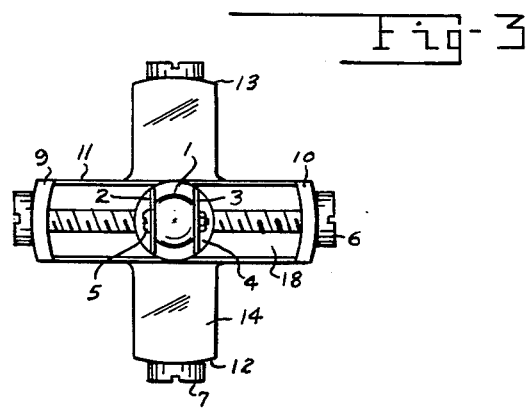
FIG. 3 is an enlarged plan view from above of the goniometer head and the adapter that are shown in FIG. 2.
Figure 5:
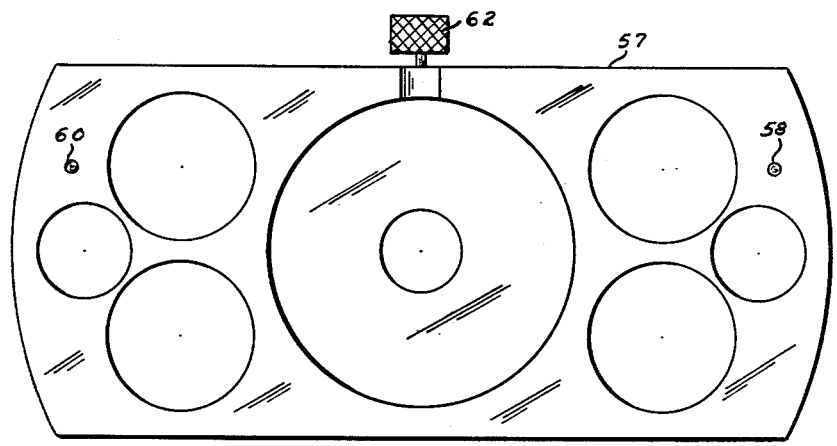
FIG. 5 is a plan view from above of a spacer block receptacle for the hollow cylinder part of the device.
Figure 6:
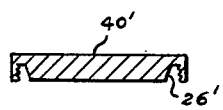
FIG. 6 is a sectional view of an unapertured cap for the hollow cylinder in FIG. 4.

The hollow cylinder 25, as shown in FIG. 4 of the drawings, is provided with a light-tight interior by having its upper end closed with a threaded cap 40 that makes engagement with the upper end of the cylinder. The cap 40 may be apertured as shown in FIG. 4 or it may be closed, as shown in FIG. 6 as cap 40'.

Preferably the cap is provided with a flange with an inclined bevel face 26 in the cap 40 and the bevel face 26' in the cap 40'. The upper edge of the cylindrical film 27 contacts the bevel 26 which assists in holding the film upper edge smoothly against the inner surface of the cylinder 25. The cylindrical film 27 has its lower edge expanded and pressed against the inner surface of the cylinder 25 by suitable means, such as by the outwardly expanding circular spring wire 28 or the like. The pair of pipes 34 and 35 pass through the cylinder cap 40 and provide desired atmosphere, such as helium, within the cylinder 25.

The spacer block 57 is provided with key pins 58, 60, etc., for seating in corresponding apertures in the body 61 and in the bracket 8. The spacer block 57 provides a receptacle for the lower end of the cylinder 25.

The block 57 preferably is apertured as shown to decrease its weight without impairing its rigidity in the assembly. Suitable means, such as the set screw 62, threads through a part of the spacer block 57 and engages the cylinder 25 for securing the association therebetween.

The structure and the operation of the device that is disclosed herein are submitted as successfully operative emodiments of this invention and similarly functioning modifications in the structure and in its operation may be made without departing from the spirit and the scope of this invention.

I claim:

1. Goniometer apparatus comprising a goniometer head of substantially spherical contour, a pair of spring metal strips gripping the goniometer head therebetween adjacent one end of the pair of strips and having a second end, a goniometer head supporting the first block to which the pair of spring metal strips are removably attached at their ends remote from their engagement with the goniometer head and the first block containing an internally threaded aperture, an externally threaded first screw making threaded engagement with the internal threads in the aperture in the first block such that on the rotation of said first screw the first block is moved longitudinally of the screw, an X-shaped double yoke having two arms extending substantially normally to each other with one arm terminating at its opposite ends in a pair of upstanding ears in which the ends of the first screw are journalled for rotation and with the X-shaped double yoke second arm terminating at its opposite ends in a pair of downwardly extending ears, an externally threaded second screw having its opposite ends journalled for rotation in the downwardly extending ears of the X-shaped double yoke second arm, a second block containing an internally threaded aperture with the internal threads of which aperture the second screw makes engagement in moving the second block along the second screw on the rotation thereof and the second block opening downwardly in a collar portion, an upwardly extending first stub shaft provided with an upper end that seats within the downwardly open end collar portion of the second block and the first stub shaft ending downwardly in a threaded end, a journal supporting housing containing a second stub shaft that is interposed between the lower threaded end of the first stub shaft and a knurled knob that serves for manually rotating the goniometer head and which knurled knob has a pin projecting downwardly therefrom, a motor-driven motor shaft boss having a pin extending laterally thereof for engaging the knurled knob pin for driving the goniometer head, and means for rotating the goniometer head through the intervening parts.

2. A goniometer apparatus comprising a head that is substantially spherical in contour, a pair of strips having one end retaining the goniometer head therebetween and having a second end, a first block to which the end of the pair of strips remote from the gonometer head is secured and having a face remote from the pair of strips, a first magnetic means secured to the first block face, an X-shaped double yoke with two arms extending substantially normal to each other and with a pair of upstanding ears at the end of one arm and a pair of downwardly extending ears at the end of the other arm, a first screw threading through the first block and with its ends journalled for rotation in the upstanding ears at the ends of one arm of the X-shaped double yoke and with the rotation of the first screw moving the first block longitudinally of the first screw, a second screw with its ends journalled for rotation in the downwardly extending ears of the X-shaped double yoke, a second block having an upper end through which the second screw is threaded for moving the X-shaped double yoke and its superstructure longitudinally of the second block and having an upper face, a second magnetic means secured to the second block upper face, and means for rotating the goniometer head through the intervening members.

3. The goniometer head that comprises a universally rotatable sphere, a pair of spring metal strips yieldingly spring-loaded toward each other to grip the sphere therebetween and each spring metal strip indented to contact a sufficient area of the sphere for accomplishing its retention, and means for rotating the pair of strips and the sphere, a sample support that is inserted into a hole in the sphere and supported by the sphere to maintain the support extending above the surface of the sphere adequately for the sample to be in the path of the X-ray beam in the taking of X-ray photographs of the sample, and means for selectively adjusting the position of the sample in placing it coincident with the goniometer X-ray beam by physically moving the sample in three directions all mutually normal to each other.

References Cited by the Examiner

UNITED STATES PATENTS

| 2,417,657 | 3/47 | McLachlan | 250—51.5 |
| 2,457,555 | 12/48 | Haworth | 250—51.5 |
| 2,533,747 | 12/50 | Thienemann | 88—40 X |

OTHER REFERENCES

General Electric XRD (X-ray Diffraction) Unit, published by General Electric X-ray Corp., Pup 7A–560, page 18.

RALPH G. NILSON, *Primary Examiner.*